July 21, 1953  E. A. MARTINELLI  2,646,507
ANTENNA
Filed Aug. 1, 1945

INVENTOR
ERNEST A. MARTINELLI
BY
*William D. Hall*
ATTORNEY

Patented July 21, 1953

2,646,507

UNITED STATES PATENT OFFICE 2,646,507

ANTENNA

Ernest A. Martinelli, Arlington, Mass., assignor, by mesne assignments, to the United States of America as represented by the Secretary of War Application August 1, 1945, Serial No. 608,293

7 Claims. (Cl. 250—33.65)

This invention relates broadly to the formation of unidirectional electromagnetic wave radiation, and more particularly to an antenna for obtaining a particularly desirable radiation pattern.

In wave propagation it frequently becomes desirable to project in one direction all, or substantially all, the energy emanating from a given antenna or antenna arrangement. Directional radiation characteristics of this nature are particularly favorable for use in radio object locating systems in order to indicate the bearing or elevation, or both of the objects producing the reflections. A paraboloidal reflector is particularly suitable for obtaining a unidirectional radiation pattern in a pencil type beam which is characteristically narrow, both in azimuth and elevation. Assuming that a pencil type beam antenna is used in an airborne radio object locating system mounted on an aircraft flying at a constant altitude, the reflector axis being substantially horizontal or tilted downward, the intensity of the illumination of the ocean surface or a relatively flat ground surface extending ahead of the aircraft is not uniform. Hence the intensities of echoes received from a distant surface target or hostile object and a nearby surface target, both included in a given vertical plane and therefore having the same azimuthal direction, are substantially different. Also, the echo signals from a given single stationary surface target varies undesirably as the aircraft approaches the target. The variation in illumination intensity results from the fact that the lower half of the magnetic plane pattern of such a system usually includes a deep null and a sharp major half lobe and from the fact that the illumination intensity is inversely proportional to the distance or range of the earth's surface as measured along an angular direction from the airborne antenna to the surface. In a converse sense, assuming that the antenna is utilized in a sea-borne or landborne azimuthal scanning system, the illumination of a horizontal sky plane in which a hostile aircraft is traveling is not uniform.

It has now been found that these disadvantages can be overcome by a radiation pattern which affords a generally uniform echo strength for targets located on the earth or other surface, or at substantially equal altitudes or elevations in space, regardless of whether the target is distant or close in and it eliminates the need of tilting the antenna to obtain satisfactory coverage of the area under observation. This may be achieved in accordance with the present invention by shaping the radiation beam so that the distribution of energy in a vertical plane through-out a relatively wide angle be such that the variation of energy density versus the radiation angle is a cosecant-squared function. It is an object of the invention to produce such a radiation pattern.

Another object of this invention is to construct an antenna arrangement particularly adaptable for use for providing a continual search of near and far objects.

It is another object to provide an antenna arrangement for use in synthesizing a radiation pattern.

It is still another object to provide an antenna arrangement for use with a parabolic reflector for producing a $\csc^2 \theta$ radiation pattern where the angle $\theta$ is measured with respect to the axis of directivity of the reflector and in one quadrant intersecting said axis.

Other objects and advantages of the present invention will become apparent from a careful consideration of the following description when taken together with the drawings, the figures of which are not to be construed as a definition of the limits of the invention.

Figure 1:
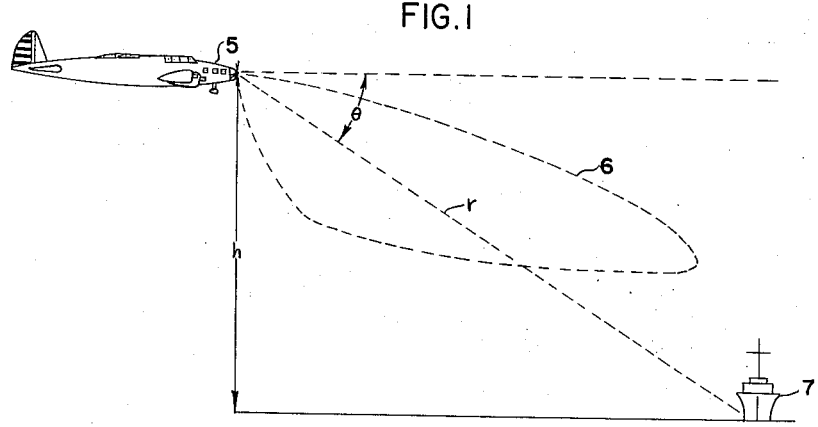
Fig. 1 is an explanatory diagram illustrating the application of the principles of the present invention.

Reference is now had to Fig. 1 wherein there is shown a sketch illustrating the principles and practicability of flaring a radiation pattern in the vertical plane. Herein is shown an airplane 5 from which the desired radiation pattern 6 is projected for use in detecting objects remotely disposed on the earth's surface, such as the ship 7. As shown in the figure, the amount of energy reaching objects on the surface of the earth is normally inversely proportional to $r^2$. But since $$r^2 = \frac{h^2}{\sin^2 \theta}$$

the actual amount of energy reaching the targets will be directly proportional to the $\sin^2 \theta$. Hence, in order to provide uniform illumination along the earth's surface and within a given range of $\theta$, the vertical distribution pattern must contain a corrective factor=

$$\left[\frac{1}{\sin^2 \theta}\right] \text{ or } \csc^2 \theta$$

For practical reasons, flaring of the radiation pattern is usually limited to about 30 or 40 degrees although it is desirable and practical to obtain a flaring as high as 70°, measured relative to the axis of the paraboloid. Also, the axis of the paraboloid should be tilted downward at an angle of about 20° from the horizontal in order to provide adequate illumination forward or laterally from the plane depending upon the orientation of the antenna. Thus, the angular distribution of energy will be confined between the limits of $\theta=20°$ and $\theta=70°$ depending upon the degree of flare and tilt.

Since in radio object-locating use the same antenna is used in transmitting and receiving, the directive characteristic of the antenna will enter into both transmission and reception. Thus, the antenna pattern herein set forth will compensate for the relative weakness of echoes from similar reflecting objects disposed over the earth's surface.

Special fanning or flaring of the radiation pattern, such as $csc^2\theta$ pattern as referred to above is particularly useful in connection with radio-object locating systems such as are used for long range search, blind bombing and beacons.

Figure 2:
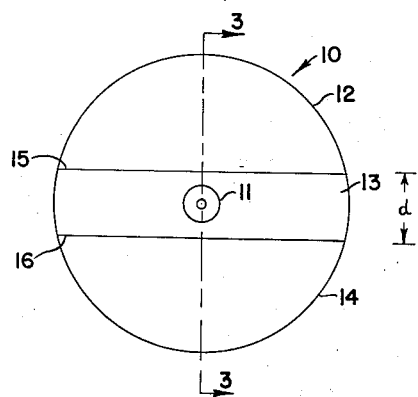
Fig. 2 is a front elevation view of an antenna according to one embodiment of the present invention.
Figure 3:
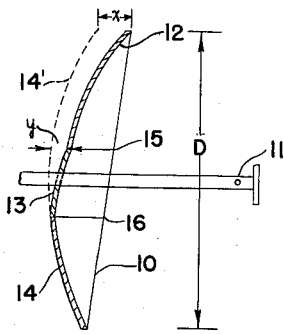
Fig. 3 is a side sectional view taken along the line 3—3 of Fig. 2.

Referring now to Figs. 2 and 3, there is shown a reflector 10 having a substantially circular front view configuration and a vertical sectional configuration similar to that of a reflector which is generally shaped as a paraboloid of revolution. A radiating element or feed 11 is constructed and located in a conventional manner for illuminating reflector 10.

Reflector 10 according to this invention has a reflecting surface formed in three parts; a lower portion 14, a central portion 13 and an upper portion 12. As thus formed, the reflector 10 is adapted for airborne use in directing a beam in a downward direction, as will appear more fully hereinafter. It will be understood that these portions will be in reversed order when it is desired to direct the beam upwardly, such as from a ground or ship installation.

Lower portion 14 extending below the level of the radiator 11 is a portion of a paraboloid surface, the completed configuration of which is indicated by the broken line extension portion 14' in Fig. 4. The focal point of portion 14 is located approximately at the apparent center of radiation of the radiating element or source 11.

The upper portion 12, which extends above the radiating element or source 11, is also a portion of a paraboloidal surface having substantially the same configuration as that of portion 14' assuming that lower portion 14 is extended as indicated at the broken lines at 14' to form a complete paraboloid. Portion 12 is so arranged that its surface is disposed slightly forward of and tilted at a slight angle relative to the extension 14' of the lower portion 14. Thus, the space between portion 12 and extension 14' is approximately one quarter of the wave length of the radiant energy. Preferably the space $x$ between the outer edges of the upper portion 12 and of extension 14' is approximately equal to $.35\lambda$ and the distance $y$ between the lower edge of portion 12 and the adjacent portion of the extension 14' is approximately $.20\lambda$ where $\lambda$ is the wave length of the radiation energy directed from the radiator 11.

Central portion 13 comprises an elongated curved strip or sheet extending substantially horizontally across the full width of reflector 10. The curvature of strip portion 13 is preferably substantially parabolic. Central strip portion 13 has relatively long and horizontal parallel upper and lower edges 15 and 16, corresponding in length and curvature to the parallel lower and upper parallel edges of upper and lower portions 12 and 14 respectively, and relatively short side edges 17 shaped to conform with the front view configuration of reflector 10 as indicated more clearly in Fig. 3. Upper and lower edges 15 and 16 preferably lie in planes parallel to and substantially equidistant on opposite sides of a horizontal plane through the axis of reflector 10. Preferably the vertical distance $d$ between upper and lower edges 15 and 16 is approximately equal to one-fifth of the distance D between the upper extremities of upper portion 12 and the lower extremities of lower portion 14. Thus the area of strip 13 is generally equal to one-fifth of the aperture of reflector 10. The upper and lower edge portions 15 and 16 are joined along their lengths to the lower and upper edge portions 12 and 14 respectively in any suitable manner, so that central portion 13, together with upper and lower portions 12 and 14 present a substantially continuous, although non-uniform, reflecting surface. Thus, central portion 13 acts effectively as a transition member between upper and lower portions 12 and 14.

As thus described, the combination of upper portion 12 and central portion 13 of the reflector 10 tends to concentrate the radiation directed thereon by radiator 11 in a downward direction, while the lower portion 14 tends to concentrate the radiation ahead of the reflector. The combination of these effects is such as to produce a radiation pattern which closely approximates the relationship $csc^2\theta$, which pattern is indicated in dotted lines in Fig. 1. It should be noted that modifications can be made in the shape of the several portions of reflector 10, if desired, to alter the cosecant-squared pattern or to produce any other desired fan-type beam pattern.

While there has been described what is at present considered to be the preferred embodiment of this invention, it will be apparent to those skilled in the art that many variations and modifications may be made therein without departing from the scope of the invention as set forth herein.

What is claimed is:

1. An antenna comprising a reflector, said reflector comprising a first section of a paraboloid truncated to form a first edge lying in a plane, a second section of said paraboloid truncated to form a second edge lying adjacent said first edge in a second plane spaced from said first plane and parallel thereto, and a third member comprising a curved parallel edged strip the width of said space between said first and second sections joining said first and second sections along said first and second edges, said first and second sections having focal points displaced from one another; and a directional radiating element at one of said focal points having its radiation pattern overlapping said first and second sections and illuminating one of said sections more intensely than the other.

2. An antenna as claimed in claim 1 wherein said first section is spaced forwardly of the imaginery adjacent surface which would have been formed by completion of the paraboloidal configuration of said second section, the spacing being approximately $.35\lambda$ at the outer edge of said first section and approximately $.20\lambda$ along the edge of said first section in connection with said third member.

3. In an antenna system: a reflecting element having a plurality of reflecting surfaces; said reflecting surfaces having focal points which are displaced with respect to each other; and a directional radiating element disposed relatively closer to a selected one of said focal points than to the others, and having its radiation pattern overlapping said reflecting surfaces and illuminating one more intensely than the others.

4. An antenna as claimed in claim 3, said reflecting surfaces comprising sections of paraboloids.

5. A directive antenna comprising a radiating device and a reflector positioned to be illuminated by said radiating device, said reflector including a first directive reflector portion positioned at a predetermined distance from said radiating device and having a first axis of directivity and a first focus, a second directive reflector portion spaced from said first portion and positioned relatively closer to said radiating device than said first portion and having a second axis of directivity and a second focus, said second focus being displaced from said first focus and said radiating device being positioned closer to said first focus than said second focus, and a third directive reflector portion providing a smooth interconnection between the reflecting surfaces of said first and second portions.

6. An antenna as claimed in claim 3 wherein said third member is disposed substantially centrally across the width of said reflector, the distance between said parallel edges of said third member being substantially one-fifth of that between the furthest edges of said first and second sections of said reflector.

7. An antenna for synthesizing a desired radiation pattern comprising a radiating means and a reflector, said reflector having three contiguous portions, two of said portions being shaped as parts of a parabolic surface having spaced opposing parabolic edges extending horizontally across said reflector, the first of said parabolic portions being disposed closer to said radiating means than the second parabolic portion, the third portion comprising a strip extending horizontally across said reflector and having substantially parallel long edges attached along the length of said parabolic edges of said first and second portions, said two parabolic portions having focal points displaced from one another, and said radiating means being at one of said focal points and illuminating one of said parabolic portions more intensely than the other of said parabolic portions.

ERNEST A. MARTINELLI.

References Cited in the file of this patent

UNITED STATES PATENTS

| Number | Name | Date |
|---|---|---|
| 1,235,275 | Wood | July 31, 1917 |
| 1,248,456 | Clark | Dec. 4, 1918 |
| 1,625,946 | Laird | Apr. 27, 1927 |
| 2,170,028 | Kohl | Aug. 22, 1939 |
| 2,213,012 | Matera | Aug. 27, 1940 |
| 2,489,865 | Cutler | Nov. 29, 1949 |

FOREIGN PATENTS

| Number | Country | Date |
|---|---|---|
| 450,484 | Great Britain | July 20, 1936 |